United States Patent
Weber

[19]

[11] Patent Number: 5,916,496
[45] Date of Patent: Jun. 29, 1999

[54] FILLED RESIN LAMP REFLECTOR WITH NO BASE COAT AND METHOD OF MAKING

[75] Inventor: Brett W. Weber, Seymour, Ind.

[73] Assignee: Osram Sylvania Inc., Danvers, Mass.

[21] Appl. No.: 09/132,642

[22] Filed: Aug. 11, 1998

Related U.S. Application Data

[62] Division of application No. 08/601,940, Feb. 15, 1996, Pat. No. 5,865,530.

[51] Int. Cl.$^6$ ...................................................... B29D 11/00
[52] U.S. Cl. ........................ 264/1.9; 264/2.2; 264/328.2; 264/328.7; 264/328.18
[58] Field of Search ............................... 264/1.9, 2.2, 2.3, 264/328.2, 328.7, 328.17, 328.18; 362/341, 61, 83.1; 425/808

[56] References Cited

U.S. PATENT DOCUMENTS

| | | |
|---|---|---|
| 3,644,271 | 2/1972 | Tulley . |
| 3,839,129 | 10/1974 | Neumann . |
| 3,839,499 | 10/1974 | Jadamus . |
| 3,862,412 | 1/1975 | Postans . |
| 4,066,607 | 1/1978 | Breitenfellner . |
| 4,123,793 | 10/1978 | Lilley . |
| 4,124,883 | 11/1978 | Lilley . |
| 4,131,595 | 12/1978 | Breitenfellner . |
| 4,172,102 | 10/1979 | Hoene . |
| 4,404,161 | 9/1983 | Bier . |
| 4,429,004 | 1/1984 | Breitenfellner . |
| 4,456,723 | 6/1984 | Breitenfellner . |
| 4,487,862 | 12/1984 | Maruya . |
| 4,522,778 | 6/1985 | Baciu . |
| 4,617,618 | 10/1986 | Baciu . |
| 4,623,562 | 11/1986 | Breitenfellner . |
| 4,670,199 | 6/1987 | Montet . |
| 4,783,298 | 11/1988 | Oda . |
| 4,844,851 | 7/1989 | Hotta . |
| 5,275,764 | 1/1994 | Hettinga . |
| 5,413,743 | 5/1995 | Prophet . |

FOREIGN PATENT DOCUMENTS 27 23 304  12/1978  Germany .

*Primary Examiner*—Mathieu D. Vargot
*Attorney, Agent, or Firm*—William E. Meyer

[57] ABSTRACT

A method of molding resin having substantial amounts of fiber and mineral fillers that provides, without the necessity of a base coat, a metallizable surface of reflector quality is possible. The method is useful for making a vehicle lamp reflector with a substantially organic skin over a substantially inorganic core. The organic skin may be metallized without using a base coat. The reflector may even be molded to give a surface gloss sufficient to be metallized without a base coat, and still meet the optical and durability requirements necessary for a vehicle headlamp.

28 Claims, 3 Drawing Sheets

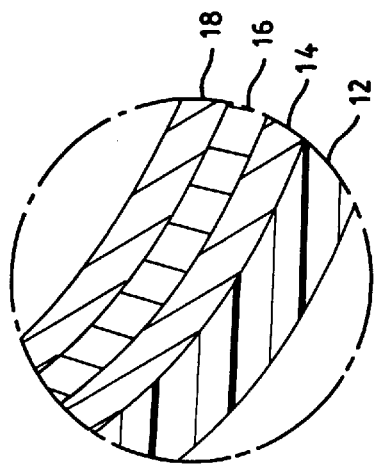
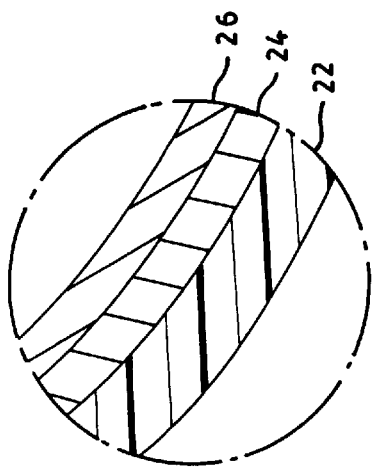
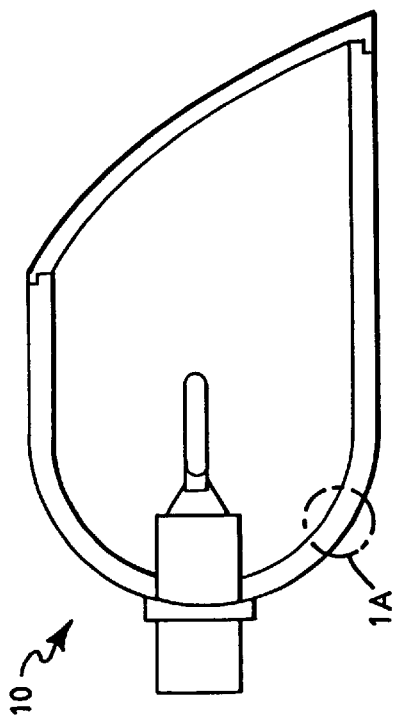
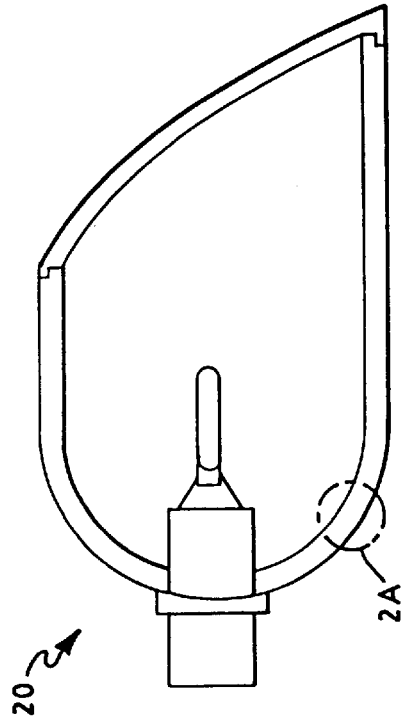

FILLED RESIN LAMP REFLECTOR WITH NO BASE COAT AND METHOD OF MAKING

Basic aspects of this invention are disclosed in application "Filled Resin Lamp Reflector with No Base Coat and Method of Making," Ser. No. 08/601,940 now issued as U.S. Pat. No. 5,865,530 filed by the present Applicant on Feb. 15. 1996, and the benefit of the filing date of that application is hereby claimed for this Divisional Application.

TECHNICAL FIELD

The invention relates to methods of plastic molding and particularly to those providing high surface quality. More particularly the invention is concerned with a method of molding a vehicle lamp reflector from a plastic material with glass and mineral reinforcement material yielding a fine surface.

BACKBROUND ART

FIG. 1. shows a schematic cross section of a prior art headlamp, showing a magnified section of a reflective wall portion. The headlamp 10 includes a plastic resin wall 12 that commonly includes fill materials. Over the wall 12 is placed a base coat 14 that smoothes out and seals over the irregularities of the plastic resin wall 12. The smooth base coat 14 is then metallized with a reflective layer 16 (aluminum). The reflective layer 16 is further coated with a clear protective coating 18 to prevent tarnishing or other injury to the reflective layer 16.

Headlamps are being sculpted to conform with the aerodynamic shapes of vehicles. It is convenient to use molded plastic resin for the headlamp, including the reflector portion directing the light onto the road. To be effective, headlamps require fine optical reflectors to accurately and efficiently reflect the available light. It is known that high quality reflectors can be made from pure resins, particularly, high cost resins such as polycarbonates, polyether-imide, polyphthalate-carbonate, polyarylsulone, and other engineering thermoplastics. To avoid the high cost material, headlamps are commonly made from a combination of a moderately priced resin, glass fiber and an inexpensive filler such as talc, calcium carbonate, or others. The glass fiber improves the strength and the filler lowers the overall cost of the reflector, and improves dimensional stability. Unfortunately the fiber and fillers can appear at the surface, causing a rough, pitted or otherwise irregular surface. If the rough surface is metallized directly, the resulting reflector can be hazy, pitted, and otherwise irregular. A substantial portion of the reflected light is then lost, or misdirected.

This problem is so important that, a base coat is commonly applied over the region where the reflector is to be formed. The base coat evens the rough surface to provide the smooth base needed for a fine reflector. Unfortunately, base coating materials are expensive, and environmentally noxious. The base coats can also run, drip, or build up in irregular ways in seams, or crevices. These irregularities can cause a headlamp to be rejected for cosmetic reasons, or because of the irregularly directed light from these regions causes too much glare. The base coat must therefore be applied with great care, usually meaning, slowly in controlled patterns and then cured in a controlled environment. Applying the base coat is then expensive, noxious, and time consuming. There has been a need for a glass fiber and mineral filled headlamp that has a fine reflector surface that does not need a base coat. This need has been recognized for some time, and there have been several attempts to satisfy this need. None of these attempts have been sufficiently successful to provide a quality headlamp reflector. There is then a long recognized need for a glass fiber and mineral filled headlamp that requires no base coat.

In the past it was known to make molded headlamp reflectors by injection molding, and injection compression molding. Bulk material is fed from a hopper by an auger into a heated barrel. Once in the injection barrel, the bulk material is warmed by the heat from the barrel and by the shearing force of the screw moving the material forward, as a load or shot fills the mold. The screw feed also causes the bulk material to become warm, and plastic. After being warmed, the shot is forced under pressure from the injection screw into a heated mold, where it ideally fills all the voids in the open volume of the mold. The pressure of the feed material forces the warm plastic into the mold where it should fill all of the open volume, and then cure sufficiently to be released as a firm piece. The material under heat and pressure then is cured sufficiently to be released as a firm piece. The same process occurs in the injection compression process, except that a further compression is added to the material while it resides in the mold. Standard ranges of parameters for these methods are set out in the following table:

TABLE 1

| | Prior Art | |
|---|---|---|
| Molding Parameter | Injection | Injection-Compression |
| Barrel Temperature (° F.) | 80 to 110 | 80 to 110 |
| Back Pressure (psi) | 20 to 50 | 20 to 50 |
| Barrel Residence Time (min) | not applicable can be hours | not applicable can be hours |
| Compression Gap (inches) | not applicable | 0.06 to 0.09 |
| Injection Speed (seconds) | 2 to 5 | 2 to 5 |
| Injection Flow Rate (cc/second) | <300 | <300 |
| Injection Pressure (psi) | <1500 | <1500 |
| Cushion: | 0.05 | 0.05 |
| Hold Pressure (psi) | 300 | not applicable |
| Hold Pressure Time (seconds) | 3 to 10 | not applicable |
| Mold Surface Temperature (° F.) | 280 to 340 | 280 to 340 |
| Cure Time (seconds) | >40 | >40 |

The Applicant in attempting to satisfy production needs for a no base coat headlamp asked five suppliers for their best samples. These samples were tested and found to have surface glosses that varied from 2 to 75 using ASTM test E430 at 20°. It is estimated that a value of 80 or more is necessary to provide a vehicle headlamp that is sufficiently efficient, and has an acceptably low glare. There is then a need for a method of making a glass and mineral filled vehicle headlamp with a surface gloss greater than 80.

In the present invention, the molding process has been improved to enable the production of parts that meet the above standards. The development of the relationship between the molding parameters that is described and the resulting surface quality of the molded article capable of meeting the above requirements, is believed to be novel. The lamp reflector with no base coat is also believed to be novel.

DISCLOSURE OF THE INVENTION

A vehicle lamp reflector may be made having a molded plastic shell having a substantial portion of inorganic fill material, with a reflector region having a smooth surface skin of with little or no inorganic fill materials, a metallized surface layer formed on the molded plastic skin in the reflector region, and a protective layer formed over the metallized layer. No base coating is used.

BRIEF DESCRIPTION OF THE DRAWINGS

FIG. 1. shows a schematic cross section of a prior art headlamp, showing a magnified section of a reflective wall portion.

FIG. 2. shows a schematic cross section of a headlamp with no base coat, showing a magnified section of a reflective wall portion.

BEST MODE FOR CARRYING OUT THE INVENTION

Figure 3:
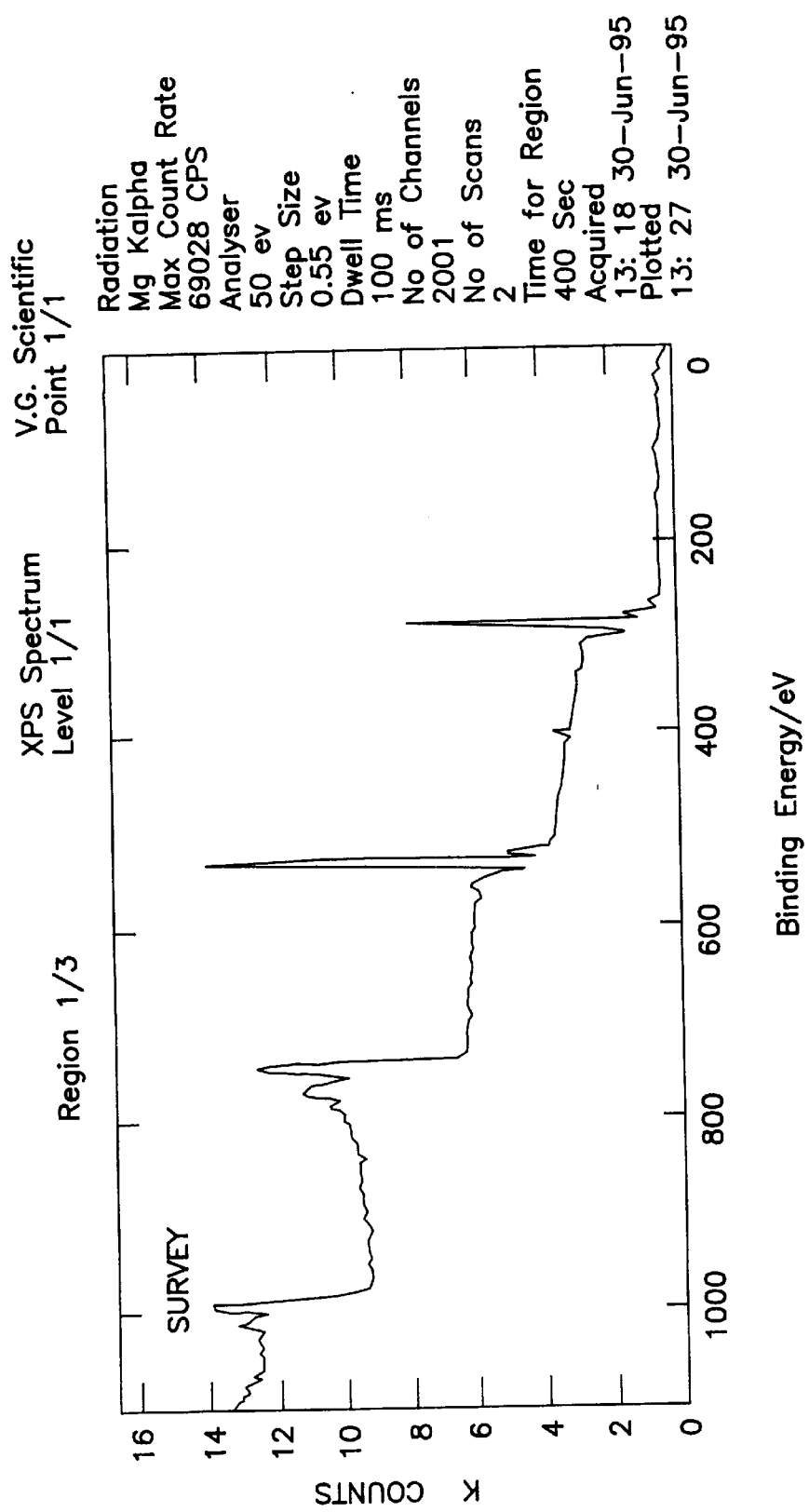
FIG. 3 is a chart of XPS data surveying the inside surface of a molded headlamp piece.

FIG. 2. shows a schematic cross section of a headlamp 20, showing a magnified section of a reflective wall portion. The headlamp 20 includes a plastic resin wall 22 that includes fill materials. The wall 22 is then metallized with a reflective layer 24, such as aluminum. The reflective layer 24 preferably is further coated with a clear protective coating 26 to prevent tarnishing or other injury to the reflective layer 24.

To make the headlamp 20, one must make the plastic reflector 22. The first step is to select a molding compound. The molding compound should be able to provide a high gloss, low profile surface sufficient to accept direct metallization, yielding a highly reflective surface with little or no surface glare or haze. The reflector should also be resistant to the temperature extremes, mechanical stresses, and chemical environment typical of the extremes seen by a vehicle headlamp. A typical thermoset molding compound used in headlamp manufacture contains an unsaturated polyester resin, styrene, a low profile additive, mineral fillers, and glass reinforcements. Such bulk molding materials are known in the art, and numerous variations to the particular composition are believed to be possible. A more preferred material would comprise a polyester or related copolymers of perhaps 12 to 18 percent by weight. A few percent by weight of styrene is used for crosslinking. Low profile additives such as methyl methacrylate polyolefins amounting to 8 to 15 percent by weight are used. The thermoset material may include glass fibers and mineral fillers comprising in combination at least ten percent by weight of the pre-cured molding material. The glass fiber, in eighth inch to quarter inch (3.175 to 6.35 mm) lengths may amount to 8 to 16 percent by weight. Mineral fillers such as magnesium carbonate, calcium carbonate, alumina, or titanium dioxide may be from 45 to 60 percent by weight. A free radical polymerization initiator such as t-butyl perbenzoate or cumene hydroperoxide may be from 0.2 to 1.0 percent by weight. Mold release is commonly included, such as a metal (zinc or calcium) sterate in the range of 0.5 to 2.0 percent by weight. There can be considerable variability in the weight percents, as disclosed in the literature. Applicants prefer a material with a relative high total percent of inorganic material, perhaps 70 or more percent by weight. BMC "324" compounds from Bulk Molding Compounds Inc. of Batavia Ill., have proven to be successful, and are the preferred materials. This material is believed to made from approximately 55 weight percent calcium carbonate (majority cacite, and a minority aragonite), 17 to 18 weight percent glass fiber, and about 27.5 percent organic polymers. The organic polymers are believed to include about 13.5 percent styrene and related materials (such as p-ethylstrene, and α-methylstrene), and a 11.2 weight percent polyester believed to a coplymer of fumaric acid with a dio, such as polyalkylene oxide glycol. The composition is very well mixed.

Two distinct molding techniques have been developed. The first is rapid injection, wherein the bulk material is quickly fed into the mold under heat and pressure. The second method is rapid injection and compression, wherein the bulk material is rapidly fed into a slightly open mold under heat and pressure. The mold is left slightly open during the filling step, providing a gap opening. After the mold is filled, additional pressure is applied to the material by closing the mold gap. The fully closed mold is then held under pressure while the material cures. The molding parameters that have proven to produce the best part for complex or parabolic headlamp reflectors are illustrated in Table 2.

TABLE 2

| Molding Parameter | Injection | Injection-Compression |
|---|---|---|
| Barrel Temperature (° F.) | 100 to 130 | 100 to 130 |
| Back Pressure (psi) | 20 to 60 | 20 to 60 |
| Barrel Residence Time (min) | <5 | <5 |
| Compression Gap (inches) | N/A | .04 to .07 |
| Injection Speed (seconds) | <1.5 | <2.0 |
| Injection Flow Rate (cc/second) | >250 | >200 |
| Injection Pressure (psi) | <2000 | <2000 |
| Cushion | .02 | .02 |
| Hold Pressure (psi) | >500 | N/A |
| Hold Pressure Time (seconds) | >5 | N/A |
| Mold Surface Temperature (° F.) | >360 | >360 |
| Cure Time (seconds) | >25 | >25 |

The barrel temperatures are required to make the compound fluid enough to best duplicate the finish of the mold. Using lower barrel temperatures gives a higher material viscosity that tends to make a porous, or rough surface on the molded part. The molded parts then do not meet the gloss requirements. Using too high of barrel temperature, or too long of residence time in the barrel leads to a pre-gel or separation of polymer components which produces surface defects in the molding, for example, along the segregation boundaries formed between the polymer components.

When the barrel temperature is too cool, the material tends to have higher viscosity leading to filling difficulties and inadequate reproduction of mold surface. When the material is too hot, the material can pre-gel leading to surface defects. The best barrel temperature is then kept as high as possible without causing the material to react prematurely. In general, the barrel temperature should be increased to a temperature that yields minimum viscosity and adequate barrel residence time without causing a pre-gel condition. For the preferred material, this has meant keeping the barrel temperature in the range of 100 to 130 degrees Fahrenheit.

Back pressure is maintained on the part through the threaded screw feed system, where the next shot of plastic is being prepared for the next molded part. The back pressure does two things for the process. The back pressure ensures a homogeneous shot. Inhomogeneities, such as agglomeration of fillers or variations in shot size can cause surface defects. The back pressure also keeps the previous shot uniformly packed in the mold. Dropping the back pressure can allow the previous shot to back slightly out of the mold giving a surface waviness.

When the back pressure is too low, inadequate packing of the previous shot and short shots can occur. When the back pressure is too high, the possibility of pre-gel exists. The back pressure should then be as high as possible without causing excessive shear heating of the material. In general, the back pressure should be increased to the point where maximum packing of the part occurs without adversely affecting the quality of the next shot being plasticized. Over heating the next shot is usual problem with maintaining too high a back pressure. For the preferred material, the preferred back pressure is in the range of 20 pounds per square inch to 60 pounds per square inch.

When the barrel residence time is too short, there may be insufficient mixing, so the material tends to have inhomogenous qualities that are evident as surface defects in the molded part. When the barrel residence time is too long, the material may over heat, leading to a pre-gel condition, which also causing surface defects. The barrel residence time is then kept as short as possible while maintaining a homogenous shot. In general, the barrel residence time should be decreased to a minimum that allows homogeneous injection of the bulk material to form an acceptable part. For the preferred material this has meant keeping the barrel residence time in the range of 300 seconds.

The compression gap in the injection and compression method is critical. It has been found that too small of a gap produces short shots. Also, when the compression gap is too small, burning occurs. This burning can occur when the bulk material is forced to pass at high speed through the small gap resulting in high shear and frictional heat. When the shot is short, compensating the fill adjustments to the process still results in laking, pre-gel, or other surface defects in the molded article. If the gap is too large, excessive flash becomes a problem. Also, with too large of a gap, the shearing action on the material, which plays a critical role in the surface smoothness is lost, producing a rough surface which does not meet the requirements. When the compression gap is too large, the glass fibers are not broken up. They then protrude through the surface, yielding a hazy appearance after metallization. The compression gap is then kept as small as possible without causing thermal degradation or short shots. In general, the compression gap should be decreased to a minimum that allows the material to fill the part properly without causing thermal decomposition of the material. For the preferred material this has meant keeping the compression gap in the range of 0.04 to 0.07 inches.

The most critical parts of the process are believed to be the injection speed and mold temperature. It has been demonstrated through designed experiments that unless a sufficiently high mold temperature and injection velocity is reached (as described above) the surface of the molded part is not smooth enough to meet the requirements for gloss and light output. One theory explaining this phenomenon is that as mold temperature is increased, the bulk molding material is more fluid, and therefore conforms better to the exact surface details of the mold. Also, it is estimated that the thermoplastic particles in the formulation (such as the low profile additives) go through a phase separation during molding. It is also believed that, the higher the temperature, the more fluid and pliable these thermoplastic particles become. Thus the more fluid the particles become the more thoroughly the particles may be compressed to form a smooth surface, thereby taking on the high gloss surface finish of the mold.

When the injection speed is too slow, the material tends to have a porous surface. When the injection speed is too high, dieseling can occur in the cavity which burns the material in the flow fronts. The injection speed is then kept as high as possible without causing dieseling. For the preferred material this has meant keeping the injection speed under two seconds. The injection speed causes a high material flow rate into the mold. The flow speed is dependent, in part on the cavity volume, and comes into play in several ways. First, because the mold temperature is, in comparison to standard molding procedures, excessively high for mineral filled bulk molding material, there is a need to fill the cavity as quickly as possible to prevent pre-gel or pre-cure of the material. Such material that is heat cured or partially cured during injection, skids through the mold, leading to increased surface defects such as, roughness, laking, and others. Secondly, marbling in the part needs to be eliminated. Marbling can occur because of phase separation of components in the compound. Marbled regions have different surface profiles than non-marbled regions. Once the molded part is metallized a haze can be seen because of these differences. The longer the material has to separate, the greater the marbleizing effect. Again, fast injection has been found to overcome marbleization. Third, with fast injection speeds, additional shear heating is taking place in the material, this additional heating results in a further reduction of the bulk material viscosity, allowing the resin component to bleed out of the compound, and be forced to the flow front, and skin over on the mold surface, thus minimizing surface porosity due to fiber protrusion or gas evolution. Fourth, because of the high shear rate, the fiber glass pieces are believed to be broken down into smaller lengths which are less able to protrude through the surface of the molded part and this also enhances the surface smoothness. When the injection flow rate is too slow, the material tends to have porous surface. Again, when the injection flow rate is too high, dieseling can occur, so the injection flow rate is kept as high as possible without causing dieseling. For the preferred material, this has meant an injection flow rate in the range of 200 to 300 cubic centimeters per second.

When the injection pressure is too low, the desired injection speed and flow rate cannot be reached. When the injection pressure is too high, there is no effect. The injection machine then only needs to use enough pressure to reach the desired injection speed. The preferred injection pressure is then kept high enough to insure the desired injection speed is reached. For the preferred material this has meant an injection pressure in the range of 2000 pounds per square inch.

Material that is left in the barrel, in front of the screw, but was just short of being injected into the previous mold, is referred to as the cushion. When the cushion is too small, insufficient packing and shot to shot variation can occur, leading to surface defects. When the cushion is too large, the material can stagnate and cause a pre-gel condition. The cushion is then kept as small as possible while maintaining shot to shot consistency. In general, the cushion should be decreased to a minimum that prevents the screw from bottoming out and still maintaining enough packing pressure on the part. For the preferred material, the cushion has been in the range of 0.02 inches.

The higher the hold pressure the better the surface quality. The exact hold pressure necessary depends on the geometry of the part as well as the gate size and location. With the injection compression method, the holding pressure is not applicable because as the mold gap is closed, the mold steel and cavity steel mate, sealing of the runner system, thereby compressing the shot in the mold. Thus any pressure applied by the screw feeder would not be exerted on the molded part.

When the hold pressure is too low, the material tends to shrink away from the mold surface causing variation in the surface profile. When the hold pressure is too high, the part can stick and break upon ejection. The hold pressure is then kept as high as possible without causing the part to stick. In general, the hold pressure should be increased to a maximum that still allows easy ejection of the part. For the preferred material this has meant keeping the hold pressure in the range of 500 pounds per square inch.

When the hold pressure time is too short, the material tends to shrink away from the mold surface causing variation in the surface profile. When the hold pressure time is too long, the only adverse affect is an increase in overall cycle time. The hold pressure time is then kept long enough to allow the material to cure and maintain the surface characteristics of the tool. For the preferred material this has meant keeping the hold pressure time in the range of 5 to 10 seconds.

When the mold surface temperature is too cool, the material tends to have a porous surface. When the mold surface temperature is too hot, the material can burn or pre-gel, causing surface defects and short shots. The mold surface temperature is then kept as high as possible without causing the pre-gel or burning. In general, the mold surface temperature should be increased to a maximum that allows the part to be successfully filled without causing pre-gel or burning of the material. For the preferred material this has meant keeping the mold surface temperature in the range of 350 to 380 degrees Fahrenheit.

To enable the high mold temperatures and fast injection speeds, a well ventilated tool (preferably vacuum assisted) is necessary for the straight injection molding procedure. With the injection compression procedure, the fact that injection is taking place with the mold partially open, there is generally sufficient ventilation provided through the open gap extending around the seal line between the two mold halves. Without ventilation the bulk material can diesel or burn at the end of the flow fronts. This is due in part to gas entrapment and excessive heat and pressure.

When the cure time is too short, the material tends to stick in the mold upon ejection. When the cure time is too long, the overall cycle time is unnecessarily increased which will thus increase the barrel residence time. The cure time is then kept as short as possible without causing the under cure of the part. For the preferred material this has meant keeping the cure time in the range of 35 seconds.

The tooling is also relevant to the process. All work done by the Applicant pertains to two cavity thermoset injection molds, using cartridge heaters controllable by 16 zones per mold half. Temperature deviations in a zone were typically held to within plus or minus five degrees Fahrenheit (+/−5°F.). Tools were polished to an SPE A2 finish or better (SPE/SPI standard). Tool cavity volumes ranged from 250 cubic centimeters to 650 cubic centimeters. Injection tools are equipped with venting through ejector and boss pins as well as through a vacuum channel running around the perimeter of the cavities. A vacuum of twenty-five millimeters of mercury pressure (25 mm Hg) is applied during the molding cycle.

The full process then occurs as follows. A cavity mold is formed with a surface finish in at least the region to be coated for reflection, meeting or exceeding an SPE A2 standard. If a straight injection mold method is used, the mold is manufactured with sufficient ventilation. The mold is adequately cooled, heated, or otherwise coupled to thermal control devices sufficient to maintain the whole mold during molding to within 5 degrees Fahrenheit. The screw feed is loaded with a filled, fiber reinforced thermosetting bulk material capable of providing a fine surface finish. The injection barrel is heated, and held at a temperature of from 100 to 130 degrees Fahrenheit. The mold is heated and held to a temperature of at least 350 degrees Fahrenheit. If the straight injection method is used, the mold is closed. If the injection compression method is used, the mold is substantially closed, but leaving a compression gap of from 0.04 to 0.07 inches between the mold halves. A shot of the mineral filled bulk molding compound large enough to fill the cavities of the tool is built under the prescribed barrel temperatures and a back pressure of 20 to 60 pounds per square inch. Vacuum is applied to the mold. With the mold closed, the material is forced into the cavities as quickly as possible without causing dieseling or burning of the molded material. The preferred injection speed is less than 1.5 seconds for the straight molding, and less than 2 seconds for the injection compression method. The injection flow rate is more than 250 cubic centimeters per second (straight) and 200 cubic centimeters per second (injection compression). With the mold fully filled, the mold temperature is held to within 5 degrees across the mold, while the bulk molding material cures. If the straight injection method is used, after the material is injected, the hold pressure is maintained at more than 500 pounds per square inch. If the injection compression method is used, the mold is closed, bringing the gap to zero. The bulk material is then allowed to cure under the same above mentioned conditions. The cure time should be sufficient so the part is solid enough to be removed as a piece that preserves its form. For the preferred material, a cure time of something more than 25 seconds is used. Upon removal of the part from the mold, excessive flash is trimmed either with a file, or using blast media.

The cured parts are then cleaned to remove any dust from the deflashing operation(s). The dust removal cleaning can be done with water or solvents; however, the chosen fluid and application method should not leave any contamination (such as spotting) on the reflector region surface. Any residue or contamination in the reflector region becomes visible after metallization resulting in performance failures due to uncontrolled scattering of light. Deionized water and IPA isopropyl alcohol solvent washes have both proven to be successful with ambient temperature followed by 350° F. forced convection air as part of a post drying processes to drive off residual water or solvents.

Next, the molded parts are assembled onto fixtures and placed in the vacuum metallization chamber. The typical vacuum metallization cycle is: 38 to 42 minutes pump down at 0.002 millibar, 3 to 5 minutes glow discharge at 0.01 Mbar, 1 minute aluminum deposition at 0.0004 Mbar. A protective layer is then added. A preferred method is to follow the metallization with 12 to 15 minutes of siloxane deposition at 0.002 Mbar, and 1 minute of ventilation. The siloxane forms a protective overcoating on the reflective aluminum layer. Upon removal from the chamber the parts are bonded and assembled with their appropriate lenses, lamp and associated hardware as the case may be.

The result of the total process is an lamp that meets 49 CFR 571.108 (FMVSS 108) photometric requirements. The lamp reflector was then been molded with glass and mineral filled bulk molding material, did not require base coating before metallizing, and still resulted in a fully functional headlamp reflector.

Analysis of the molded headlamps showed, that the mold received a full shot of material. The mold was then completely filled. The mold samples had no shortings, meaning there were no unfilled volumes to the mold. The completed headlamp was free of mold defects. There were no laking, burring, dieseling, blistering, marbling, or similar defects. The completed headlamp had a high surface gloss taken at an angle of 20° from the vertical. The headlamp achieved a high surface gloss value greater than 85 using the ASTM E430 standard number E430.

Figure 4:
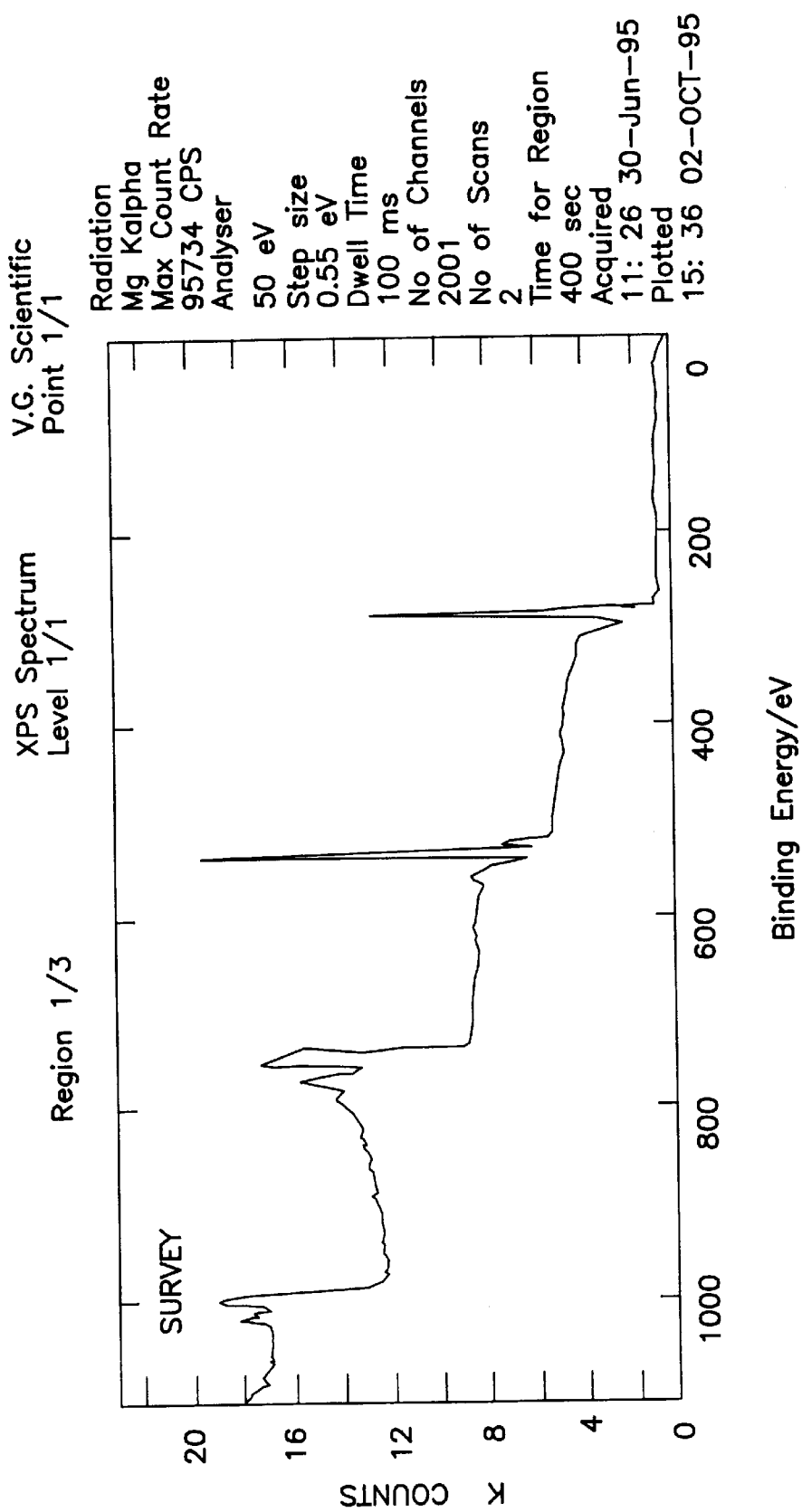
FIG. 4 is a chart of XPS data surveying the outside surface of a molded headlamp piece.

An analysis of the reflector surfaced was made using X-ray photoelectron spectroscopy (XPS) with Magnesium Kα X-rays. The exterior and reflector regions of a molded head lamp housing were examined. The XPS technique has the ability to reveal the presence of any element, with the exception of hydrogen and helium, on the surface of the specimen, within about the first 20 angstroms of depth. Elemental concentrations as low as one percent of a monolayer can be detected. A survey was done using a takeoff angle of 75 degrees, thereby giving a detection depth of about 15 angstroms. The approximate atomic concentrations obtained were 71 percent carbon, 28 percent oxygen and less than 1 percent nitrogen. Smaller amounts, less than 1%, of silicon and calcium were noted. This was true for both in exterior surface and the reflector surface. This an important result. The predominantly carbon and oxygen (organic) surface indicates a nearly pure resin layer, a skin, at the surface. This is in sharp contrast to the original material which is predominantly inorganic. Since the raw material is approximately 75 percent glass fiber and calcium carbonate, the fill material would normally be present in the surface to distort it. The Applicant's process yields a surface with little or none of the fill material, such as glass fiber and calcium carbonate. The gross pieces of glass fiber and mineral fill making up the core material are not present at the surface, and therefore do not disturb the smooth, nearly pure resin surface. FIGS. 4, and 5 show respectively XPS data collected from the inside and outside surfaces of a molded headlamp.

The skin also had only very small pores. The surface pores had diameters of less than 4 micrometers. The number of pores was also very small per unit area. The actual mold surface was found to have less than 40 pores per square millimeter. The surface pore area per total surface area was then less than 0.1 percent. This surface was then directly metallized. The metallization layer was then additionally coated with a clear protective layer as commonly known in the art. This yielded a headlamp with no base coat that had a quality reflector surface. The completed headlamp passed all 49 CFR 571.108 (FMVSS 108) requirements after assembly. These requirements include, but are not limited to, photometry, chemical resistance, temperature cycle, internal heat, humidity, and vibration. The completed headlamp was capable of producing a maximum candela spot of 30,000 or greater in the beams "hot spot" with a 55 watt, tungsten halogen incandescent lamp capsule at 12.8 volts. This may be measured as a minimum of 20,000 candela in an 18 square foot area at a distance of 100 feet from a source of 80 candela. The 55 watt at 12.8 volts is a variable source at variable distance. The disclosed operating conditions, dimensions, configurations and embodiments are as examples only, and other suitable configurations and relations may be used to implement the invention.

While there have been shown and described what are at present considered to be the preferred embodiments of the invention, it be apparent to those skilled in the art that various changes and modifications can be made herein without departing from the scope of the invention defined by the appended claims. In particular, while a headlamp reflector has been disclosed, taillight and other plastic lamp reflectors can be made using the same methods.

What is claimed is:

1. A method of injection molding a filled resin providing a surface reflector region on a molded part with quality high enough to be metallized to a reflective surface without requiring a base coat, comprising the steps of:

a) providing a mold having an internal wall defining a cavity, at least a portion of the internal wall, adjacent the part region to receive a reflector quality metallization, being polished to a degree equal to or greater than the surface quality sought in the molded part;
   b) starting with a bulk molding, thermoset material including glass fibers and mineral fillers comprising in combination at least ten percent by weight of the pre-cured molding material;
   c) injection molding the bulk molding material into the mold with an injection mold machine having a barrel and screw feed while;
   d) maintaining the barrel temperature high enough to maintain the bulk molding material in a sufficiently viscous state to enable a high injection flow rate;
   e) maintaining a back pressure on the injected bulk molding material;
   f) maintaining an injection flow rate as high as possible, with out causing dieseling of the bulk molding material;
   g) maintaining an injection pressure sufficient to induce the flow rate,
   h) providing a cushion of injection material between the molded part, and the screw end to enable a hold pressure;
   i) maintaining the hold pressure at sufficient pressure and time duration to assure complete contact between the bulk molding material and the internal wall of the mold, at least in the reflector region of the part;
   j) maintaining the mold surface temperature greater than the melting temperature of the bulk molding material, but less than any temperature at which deterioration of the bulk molding material occurs;
   k) maintaining the mold surface temperature to within a sufficiently narrow temperature variation across the mold, at least in the reflector region of the part, to maintain even material characteristics; and
   l) maintaining the bulk molding material in the mold for a time sufficient to thermoset the resin, and thereby rigidify the part sufficiently for safe removal of the part, wherein the reflector region has a surface with a lower percent fill material than the remainder of the part.

2. The method in claim 1, wherein the bulk molding material includes polyester resin, styrene, and low profile additives.

3. The method in claim 1, wherein the mold, at least in the reflector region of the part is polished to an SPE A2 or better finish.

4. The method in claim 1, wherein the back pressure is from 20 to 60 pounds per square inch.

5. The method in claim 1, wherein the bulk molding material is resident in the barrel less than five minutes.

6. The method in claim 1, wherein the injection time is less than two seconds.

7. The method in claim 1, wherein the injection flow rate is equal to or greater than 250 cubic centimeters per second.

8. The method in claim 1, wherein the injection pressure is less than 2000 pounds per square inch.

9. The method in claim 1, wherein the cushion is about 0.02 inches.

10. The method in claim 1, wherein the hold pressure is not less than 500 pounds per square inch.

11. The method in claim 1, wherein the hold pressure is held for at least five seconds.

12. The method in claim 1, wherein the mold surface temperature is from 10 to 30 degrees less than any temperature causing pre-gel or burning of the bulk molding material.

13. The method in claim 1, wherein the mold surface temperature is greater than 360 degrees Fahrenheit, and less than any temperature causing pre-gel or burning of the bulk molding material.

14. The method in claim 1, wherein the mold surface temperature is maintained to within plus or minus 5 degrees Fahrenheit, across the mold at least in the reflector region of the part.

15. The method in claim 1 wherein the part is held in the mold for a curing time of twenty-five seconds or more.

16. A method of injection molding a filled resin providing a reflector region on the part with a surface quality high enough to be metallized to a reflective surface without requiring a base coat, comprising the steps of:
   a) providing a mold having an internal wall defining a cavity, at least a portion of the internal wall, adjacent the part region to receive a reflector quality metallization, being polished to an SPE A2 or better finish;
   b) starting with a bulk molding, thermoset material comprising a polyester resin, styrene, low profile additives, and additionally including glass fibers and mineral fillers comprising in combination at least fifty percent by weight of the pre-cured molding material;
   c) injection molding the bulk molding material into the mold with an injection mold machine having a barrel and screw feed while;
   d) maintaining the barrel temperature between 100 and 130 degrees Fahrenheit;
   e) maintaining a back pressure on the injected material of between 20 and 60 pounds per square inch;
   f) maintaining an injection flow rate greater than 200 cubic centimeters per second;
   g) maintaining an injection pressure less than 2000 pounds per square inch;
   h) providing a cushion of about 0.02 inches;
   i) maintaining a hold pressure greater than 500 pounds per square inch for at least five seconds;
   j) maintaining the mold surface temperature at greater than 360 degrees Fahrenheit;
   k) maintaining the mold surface temperature to within plus or minus 5 degrees, across the mold in the region to receive the reflective surface; and
   l) maintaining the bulk molding material in the mold for a time sufficient to thermoset the resin, and thereby rigidify the part sufficiently for safe removal of the part, wherein the reflector region has a surface with a lower percent fill material than the remainder of the part.

17. A method of injection-compression molding a filled resin providing a surface reflector region on a molded part with quality high enough to be metallized to a reflective surface without requiring a base coat, comprising the steps of:
   a) providing a mold having an internal wall defining a cavity, at least a portion of the internal wall, adjacent the part region to receive a reflector quality metallization, being polished to a degree equal to or greater than the surface quality sought in the molded part;
   b) partially closing the mold, leaving a gap opening;
   c) starting with a bulk molding, thermoset material including glass fibers and mineral fillers comprising in combination at least ten percent by weight of the pre-cured molding material;
   d) injection molding the bulk molding material into the mold with an injection mold machine having a barrel and screw feed while;
   e) maintaining the barrel temperature high enough to maintain the bulk molding material in a sufficiently viscous state to enable a high injection flow rate;
   f) maintaining a back pressure on the injected bulk molding material;
   g) maintaining an injection flow rate as high as possible, with out causing dieseling of the bulk molding material;
   h) maintaining an injection pressure sufficient to induce the injection flow rate and less than will cause dieseling and burning of the injection material;
   i) providing a cushion of injection material between the molded part, and the screw end to enable a hold pressure;
   j) closing the mold once it is filled;
   k) maintaining the mold surface temperature greater than the melting temperature of the bulk molding material, but less than any temperature at which deterioration of the bulk molding material occurs;
   l) maintaining the mold surface temperature to within a sufficiently narrow temperature variation across the mold, at least in the reflector region of the part, to maintain even material characteristics;
   m) maintaining the hold pressure at sufficient pressure and time duration to assure complete contact between the bulk molding material and the internal wall of the mold, at least in the reflector region of the part; and
   n) maintaining the bulk molding material in the mold for a time sufficient to thermoset the resin, and thereby rigidify the part sufficiently for safe removal of the part, wherein the reflector region has a surface with a lower percent fill material then the remainder of the part.

18. The method in claim 17, wherein the gap opening is from 0.04 inches to 0.07 inches.

19. The method in claim 17, wherein the back pressure is from 20 to 60 pounds per square inch.

20. The method in claim 17, wherein the bulk molding material is resident in the barrel less than five minutes.

21. The method in claim 17 wherein the injection time is less than two seconds.

22. The method in claim 17, wherein the injection flow rate is equal to or greater than 200 cubic centimeters per second.

23. The method in claim 17, wherein the injection pressure is less than 2000 pounds per square inch.

24. The method in claim 17, wherein the cushion is about 0.02 inches.

25. The method in claim 17, wherein the mold surface temperature is greater than 360 degrees Fahrenheit.

26. The method in claim 15, wherein the mold surface temperature is maintained to within plus or minus 5 degrees, across the mold in the region to receive the fine surface.

27. The method in claim 17, wherein the part is held in the mold for a curing time of twenty-five seconds or more.

28. A method of injection-compression molding a filled resin providing a surface reflector region on a molded part with quality high enough to be metallized to a reflective surface without requiring a base coat, comprising the steps of:

a) providing a mold having an internal wall defining a cavity, at least a portion of the internal wall, adjacent the part region to receive a reflector quality metallization, being polished to a degree equal to or greater than the surface quality sought in the molded part;

b) partially closing the mold, leaving a gap opening from 0.04 inches to 0.07 inches;

c) starting with a bulk molding, thermoset material comprising a polyester resin, styrene, low profile additives, and additionally including glass fibers and mineral fillers comprising in combination at least ten percent by weight of the pre-cured molding material;

d) injection molding the bulk molding material into the mold with an injection mold machine having a barrel and screw feed while;

e) maintaining the barrel temperature high enough to maintain the bulk molding material in a sufficiently viscous state to enable a high injection flow rate;

f) maintaining a back pressure on the injected bulk molding material;

g) maintaining an injection flow rate as high as possible, with out causing dieseling;

h) maintaining an injection pressure sufficient to induce the flow rate, and less than will cause dieseling and burning of the injection material;

i) providing a cushion of injection material between the molded part, and the screw end to increase hold pressure;

j) closing the mold after injection of the bulk molding material;

k) maintaining the mold surface temperature greater than 360 degrees Fahrenheit, and less than any temperature causing pre-gel or burning of the bulk molding material;

l) maintaining the mold surface temperature to within plus or minus 5 degrees, across the mold in the region to receive the reflective surface; and m) maintaining the bulk molding material in the mold for a time sufficient to thermoset the resin, and thereby rigidify the part sufficiently for safe removal of the part wherein the reflector region has a surface with a lower percent fill material than the remainder of the part.

* * * * *